United States Patent
De Wever et al.

(10) Patent No.: US 12,034,725 B2
(45) Date of Patent: *Jul. 9, 2024

(54) DATA MANAGEMENT SYSTEM

(71) Applicant: Fomtech Limited, London (GB)

(72) Inventors: Martijn De Wever, London (GB);
Sasha Imamovich, London (GB)

(73) Assignee: FOMTECH LIMITED, London (GB)

( * ) Notice: Subject to any disclaimer, the term of this patent is extended or adjusted under 35 U.S.C. 154(b) by 181 days.

This patent is subject to a terminal disclaimer.

(21) Appl. No.: 17/491,907

(22) Filed: Oct. 1, 2021

(65) Prior Publication Data
US 2022/0021676 A1    Jan. 20, 2022

Related U.S. Application Data

(63) Continuation of application No. 16/271,257, filed on Feb. 8, 2019, now Pat. No. 11,140,164.

(30) Foreign Application Priority Data

Feb. 9, 2018    (EP) ..................................... 18156101

(51) Int. Cl.
| | |
|---|---|
| *G06F 16/176* | (2019.01) |
| *G06F 21/62* | (2013.01) |
| *H04L 9/40* | (2022.01) |
| *H04L 67/1097* | (2022.01) |
| *H04W 76/10* | (2018.01) |

(52) U.S. Cl.
CPC ............ *H04L 63/10* (2013.01); *G06F 16/176* (2019.01); *G06F 21/6218* (2013.01); *H04L 63/04* (2013.01); *H04L 63/0407* (2013.01); *H04L 63/0421* (2013.01); *H04L 67/1097* (2013.01); *H04W 76/10* (2018.02)

(58) Field of Classification Search
CPC ..... H04L 63/10; H04L 63/04; H04L 63/0407; H04L 63/0421; H04L 67/1097; H04W 76/10; G06F 16/176; G06F 21/6218; G06F 21/62

See application file for complete search history.

(56) References Cited

U.S. PATENT DOCUMENTS 8,966,464 B1 * 2/2015 Christopher ........ G06F 11/3442 717/166
10,445,525 B2 * 10/2019 Lovin ..................... G06F 16/00
(Continued)

FOREIGN PATENT DOCUMENTS

EP    1630641 B1    6/2015

*Primary Examiner* — Robert B Leung
*Assistant Examiner* — Howard H. Louie
(74) *Attorney, Agent, or Firm* — BakerHostetler

(57) ABSTRACT

A system for sharing data between tenants served by a software instance. In the system, a first tenant can ensure that data is transferred to a trusted connection by virtue of a trusted established between the first tenant and a second tenant, and a trusted connection between the second tenant and a third tenant. The system allows the identity of the third tenant to be kept secret from the first tenant, thus maintaining the privacy of the third tenants. In addition, the system allows for the first tenant to force control over the tenants with which the second tenant is allowed to share the first portion of the data, and the second tenant can provide an additional layer of this control.

15 Claims, 4 Drawing Sheets

(56) References Cited

U.S. PATENT DOCUMENTS

| | | | |
|---|---|---|---|
| 2011/0320955 A1* | 12/2011 | O'Connor | H04L 63/104 726/4 |
| 2013/0246475 A1* | 9/2013 | Kuruganti | G06F 16/27 707/785 |
| 2015/0163206 A1* | 6/2015 | McCarthy | H04L 63/104 726/4 |
| 2015/0363724 A1* | 12/2015 | Chatterjee | G06Q 10/06313 705/7.23 |
| 2017/0041296 A1* | 2/2017 | Ford | G06F 21/64 |

* cited by examiner

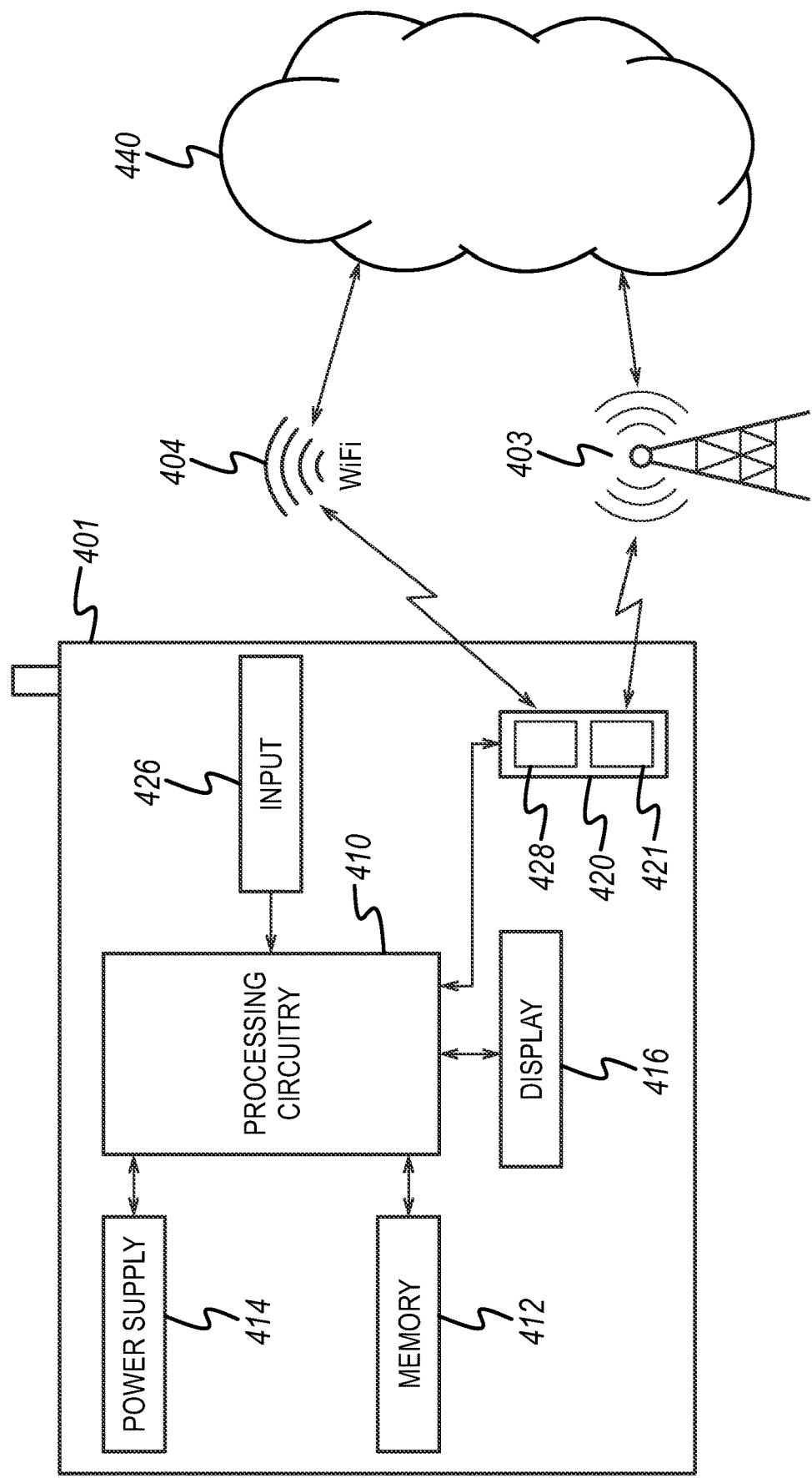

DATA MANAGEMENT SYSTEM

CROSS REFERENCE TO RELATED APPLICATIONS

This application is a continuation of U.S. patent application Ser. No. 16/271,257, filed Feb. 8, 2019, the contents of which is incorporated herein by reference in its entirety.

TECHNICAL FIELD

This disclosure relates to a system, a method and a computer program for sharing data between tenants served by a software instance.

BACKGROUND

Modern computing systems have made it possible to share a variety of data types with many different users. These systems allow users to transfer information quickly and reliably to one another. However, this benefit increases the risk of a user's data being accessed by a third party to whom which the user does not wish to share their data. Data privacy and security is of great concern in the development of modern computing systems, particularly with the increase in incidents of breaches in data security.

Digital rights management (DRM) systems aim to provide users with control over how other users can access their data. However, in the situation where one user transfers data to another user, these systems may rely on the identity of the receiver of the data being made available to the sender of the data. In certain circumstances this is desirable in order to ensure that the receiver is somebody that the sender does in fact wish to have access to the data. On the other hand, the receiver may not wish for the sender to know their identity.

Granted European patent EP 1 630 641 B1 relates to an approach for information management in which data is transferred from a data source to a user via an intermediary. In this approach, the data source is unable to control which users are sent the information, and the data source is able to obtain the identity of the users after the information has been sent. The intermediary may provide the information to users who are not authorised to receive it, and the users' identities can be made available to the source.

Managing access to users' identities and the control of data access permissions can be particularly problematic in cloud-computing environments where tenants of a software instance share computing and storage resources. It would be desirable to provide a digital rights management system that allows a user to send data to another user, while maintaining anonymity between the users and guaranteeing that the receiver of the data is permitted to access the data by the sender.

SUMMARY

This summary is provided to introduce a selection of concepts in a simplified form that are further described below in the detailed description.

In one aspect of the invention there is provided system for sharing data between tenants served by a software instance, the system comprising: a connection module arranged to establish a trusted connection between a first tenant and a second tenant of the software instance, and establish a trusted connection between a second tenant and a third tenant of the software instance; a first cloud-storage resource associated with the first tenant arranged to store a first set of data; a data transfer module arranged to transfer a first portion of the first set of data to a third cloud-storage resource associated with the third tenant; a request module arranged to transmit an access request for the first set of data from the third tenant to the first tenant, without indicating an identification of the third tenant to the first tenant; an authorisation module arranged to allow the first tenant to grant an authorisation of the access request; and wherein the data transfer module is arranged to transfer a second portion of the first set of data to the cloud-storage resource associated with the third tenant via the second tenant, in response to the authorisation.

In the system, the first tenant and the second tenant are trusted connections of one another, and thus the first tenant and the second tenant are permitted to share their identities, as well as other private information, with one another. The second tenant and the third tenant are also trusted connections of one another and can share their identities and other private information with each other as well. However, the first tenant and the third tenant do not share a trusted connection. Therefore, in order to ensure privacy the first tenant and the third tenant are required to remain anonymous to one another.

The first tenant can allow a first portion of a data set to be shared with the third tenant because the third tenant is a trusted connection of the second tenant. The first portion of the data may be, for instance, a label associated with the data or a subset of the data that has lower privacy restrictions than the remainder of the data. The first portion of the data is made available to the third tenant, which the third tenant can use to request access to another portion, or the remainder, of the data set form the first tenant.

In the system, the request for access to the data set is submitted to the first tenant without the identity of the third tenant being made available to the first tenant. However, trust in the third tenant is implied via the trust established between the first and second tenants, and the trust established between the second and third tenants, without a direct trusted connection being made between the first and third tenants. In one example, the identity of the third tenant, which the first tenant is not sent, may be the name of the third tenant or another form of identification label for the third tenant.

The first tenant can choose to grant the request for access to the data, and once the request is authorised the data is transferred from the cloud-storage resource of the first tenant to the cloud-storage resource of the third tenant. This may occur directly, or alternatively via the cloud-storage resource of the second tenant.

In this way, the first tenant can ensure that data is transferred to a trusted connection by virtue of the trusted established between the first and second tenants, and the second and third tenants respectively. However, the system allows the identity of the third tenant to be kept secret from the first tenant, thus maintaining the privacy of the third tenant.

In another aspect of the invention there is provided system for sharing data between tenants served by a software instance, the system comprising: a connection module arranged to establish a trusted connection between a first tenant and a second tenant of the software instance; and arranged to establish a trusted connection between a second tenant a third tenant of the software instance; a first cloud-storage resource associated with the first tenant arranged to store a first set of data; an access management module arranged to generate a first access restriction set by the first tenant, wherein the first access restriction comprises at least one first category of tenant to which the first set of data is not to be transmitted via the second tenant; wherein the access management module is arranged to determine if a category of the third tenant matches the at least one first category of tenant in the first access restriction; wherein the data transfer module is arranged to transfer at least a first portion of the first set of data to a cloud-storage resource associated with the third tenant, in response to the access management module determining that the category of the third tenant does not match the first category of tenant in the first access restriction; and wherein the data transfer module is arranged to prevent transmission of at least a first portion of the first set of data to the cloud-storage resource associated with the third tenant, in response to the access management module determining that the category of the third tenant matches the first category of tenant in the first access restriction.

In the system, it is possible for the first tenant to force control over the tenants with which the second tenant is allowed to share the first portion of the data. The first portion of the data may have lower privacy restrictions than the remainder of the data. However, it may be desirable to restrict access to the first portion of the data to certain categories of tenants. Thus, certain categories of tenants are unable to request access to any part of the data set of the first tenant, which prevents the data being shared with unwanted tenants. Furthermore, the second tenant is able to impose another layer of control over the category of tenants with which the first portion of data can be shared.

In another aspect of the invention there is provided computer-implemented method of sharing data between tenants served by a software instance, the method comprising: establishing a trusted connection between a first tenant and a second tenant of the software instance; establishing a trusted connection between a second tenant and a third tenant of the software instance; storing a first set of data at a first cloud-storage resource associated with the first tenant; transferring a first portion of the first set of data to a third cloud-storage resource associated with the third tenant; transmitting an access request for the first set of data from the third tenant to the first tenant, without transmitting an identification of the third tenant to the first tenant; granting, by the first tenant, an authorisation of the access request from the first tenant to the second tenant and, in response to the granting of the authorisation, transferring a second portion of the first set of data for storage at the third cloud-storage resource associated with the third tenant via the second cloud-storage resource associated with the second tenant.

In another aspect of the invention there is provided a computer-implemented method of sharing data between tenants served by a software instance, the method comprising: establishing a trusted connection between a first tenant and a second tenant of the software instance; establishing a trusted connection between a second tenant a third tenant of the software instance; storing a first set of data at a first cloud-storage resource associated with the first tenant; generating a first access restriction by the first tenant, wherein the first access restriction comprises at least one first category of tenant to which the first set of data is not to be transmitted via the second tenant; determining if a category of the third tenant matches the first category of tenant in the first access restriction; in response to determining that the category of the third tenant does not match the first category of tenant in the first access restriction, transferring at least a portion of the first set of data to the third tenant; and in response to determining that the category of the third tenant matches the first category of tenant in the first access restriction, preventing the transfer of at least a portion of the first set of data to the third tenant.

In another aspect of the invention there is provided a data processing system comprising a processor configured to perform the method described herein.

In another aspect of the invention there is provided a computer program comprising instructions which, when the computer program is executed by a computer, cause the computer to carry out the method described herein.

In another aspect of the invention there is provided a computer-readable medium comprising instructions which, when executed on a computer, cause the computer to carry out the method described herein.

In another aspect of the invention there is provided a data carrier signal carrying the computer program as described herein.

BRIEF DESCRIPTION OF THE DRAWINGS

Embodiments of the invention will be described, by way of example, with reference to the following drawings, in which:

FIG. 4 illustrates a schematic of an example device in the system.

DETAILED DESCRIPTION

Figure 1:
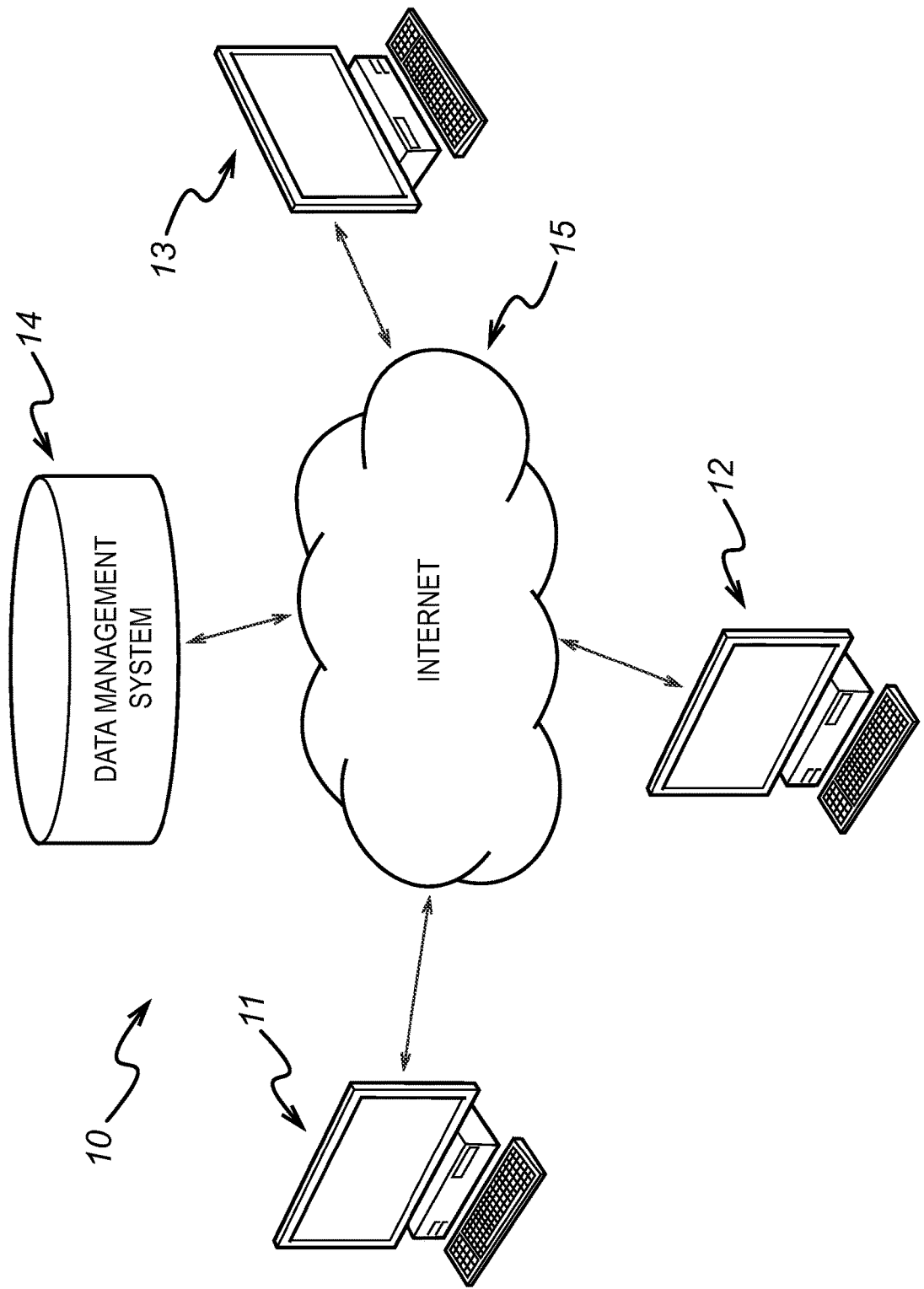
FIG. 1 illustrates the general architecture of a system for sharing data between tenants served by a software instance.

Referring to FIG. 1, there is a system 10 for sharing data between users of separate computing devices. In this example, there are at least three distinct users in involved in exchanging data with one another. Specifically, there is a first user of a first device 11, a second user of a second device 12 and a third user of a third device 13. Each one of the users is a tenant of a software instance executed at a data management system 14, which may be implemented as a server or a collection of servers. The first user may be referred to as a first tenant, the second user may be referred to as a second tenant and the third user may be referred to as a third tenant.

Each one of the tenants is associated with a cloud-storage resource that is reserved for that particular tenant. By default, a tenant is able to access data items in their own cloud-storage resource, but that tenant is not able to access data items in the cloud-storage resource associated with a different tenant without permission. In order for a tenant to access data in the cloud-storage of another tenant it is necessary for a trusted connection to be established with the other tenant, or for a specific authorisation given to the other tenant.

A tenant may be considered as a user of a software application running on a server or a group of servers. A tenant may be considered as a single user or a group of users who share a common access to the software, along with specific privileges to the software instance. The software instance referred to herein is an instance of software which runs on a server or a group of servers.

The computing devices 11, 12, 13 are arranged to communicate with one another via a communications network 15. The communications network 15, in this example, is the Internet 15. However, it will be appreciated that any suitable form of communications network 13 could be used.

The computing devices 11, 12, 13 are web-enabled by including an embedded browser or "app" or similar. In addition, each device 11, 12, 13 may comprise a display, a UI, a processor and memory. The devices 11, 12, 13 can be arranged to communicate data between one another via any suitable communications protocol or connection. For instance, the devices 11, 12, 13 may communicate with one another via a wired and/or a wireless connection. The users of the system 10 can use each respective device to receive and view data from other users of the system 10.

Figure 2:
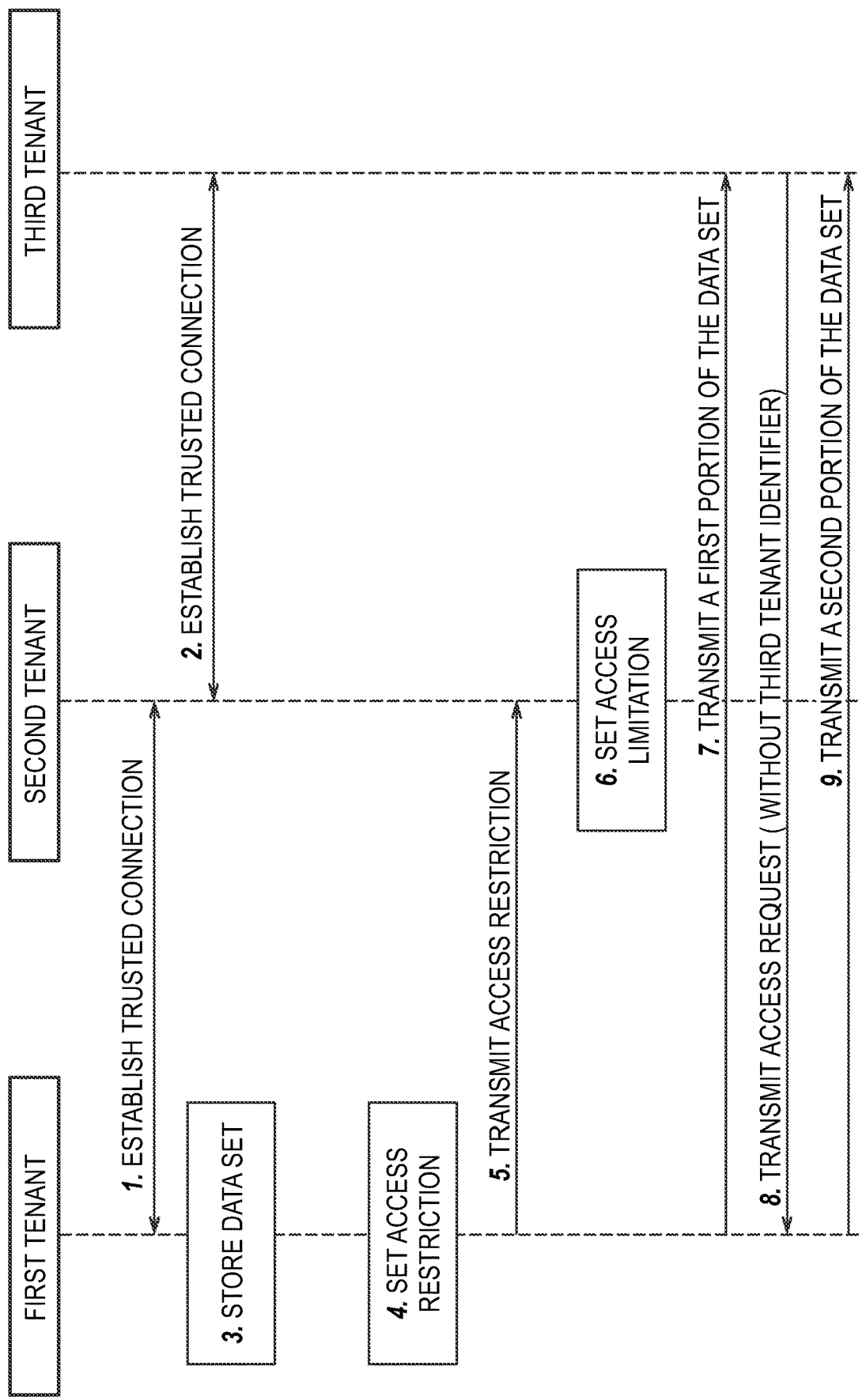
FIG. 2 illustrates a flow chart of a computer-implemented method performed by the system for sharing data between the tenants served by the software instance.

Referring to FIG. 2, there is a computer-implemented method for sharing data between the tenants of the software instance.

In step 1, the first tenant and the second tenant establish a trusted connection with one another. A trusted connection between tenants indicates that the tenants in the trusted connection have provided authorisation to share secure data with one another, such as their private identity information. The establishment of this connection may be initiated by either one of the first or the second tenant. For instance, the first tenant may use their device 11 to send a message to the device 12 of the second tenant, requesting to establish a trusted connection. In response, the second tenant can choose to accept or reject the request. Once the request has been accepted the trusted connection is established. If the request is rejected, the trusted connection is not established. In another example, the second tenant send the trusted connection request to the first tenant for acceptance or rejection, in a similar manner. A record of which tenants are trusted connections of one another and which tenants are not is stored in a database at the data management system.

In step 2, the third tenant and the second tenant establish a trusted connection with one another. The establishment of this connection may be initiated by either one of the third or the second tenant in a similar manner as in step 1.

In step 3, a data set is stored at the first cloud-storage resource associated with the first tenant.

This example is described in the context of one set of data being transferred to the cloud-storage resource associate with the third tenant. However, in another example a plurality of distinct data sets are stored at the first cloud-storage resource and transferred to the cloud-storage resource of the third tenant.

In step 4, the first tenant generates a first access restriction by providing an indication of a category of tenant that is not to receive a specific data set. The first tenant generates the first access restriction by interacting with the data management system 14 via the first computing device 11, for instance via a graphical user interface, in order to select the relevant category.

The category of tenant may be indicative of tenants associated with, or located in, particular geographical location such as a country or group of countries. Thus, it is possible to enable geo-fencing for access to the first set of data.

The category of tenant in the access restriction may be indicative of tenants that have been designated a particular status, such as a particular security status. For example, a tenant may be labelled as a tenant having a low security status and the first tenant may wish to prevent the data being sent to tenants in this category. On the other hand, another tenant may be labelled as a tenant having a high security status and the first tenant may wish to allow the data to be sent to tenants in this category.

The first tenant may also generate a first global access restriction for the a plurality of different data sets stored at the first cloud-storage resource by providing an indication of a category of tenant that is not to receive the plurality of data sets, or all of the data sets, stored at the first cloud-storage resource. The first tenant generates the first global access restriction by interacting with the data management system 14 via the first computing device 11, as discussed above.

In step 5, the access restriction(s) defined in step 4 are made available to the second tenant. Thus, it is possible to determine which of the second tenant's trusted connections can be sent the data of the first tenant.

In step 6, the second tenant generates a second access restriction by providing an indication of a category of tenant that is not to receive a specific data set provided by the first tenant. The second tenant generates the second access restriction by interacting with the data management system 14 via the second computing device 11, as above. The category of tenant may be one of the categories described above, or any other suitable category for the tenants that may receive the data.

The second tenant may also generate a second global access restriction for a plurality of data sets by providing an indication of a category of tenant that is not to receive a plurality of data sets, or all of the data sets. The second global access restriction may relate to data sets received from the first tenant and/or all other tenants.

In step 7, a portion of a first set of data that is stored at the first cloud-storage resource is transmitted to the third tenant. This step may involve the data portion being sent directly to the cloud-storage resource associated with the third tenant directly, or via the cloud-storage resource associated with the second tenant. The data portion may be a segment of the first data set that has a lower security requirement to that of the remainder of the data set. For instance, the data portion may be a label associated with the first data set that is indicative of the content of the first data set, but does not indicate the entirety of the data in the first data set. The data portion that is made available to the third tenant includes a reference to the first data set that enables the third tenant to submit a request to the first tenant to access the data.

In step 8, the third tenant initiates the request for the first data set via the third device 13. The request is sent for approval or rejection to the device 11 of the first tenant. The request does not include any indication of the identity of the third tenant. For instance, the identity of the third tenant is anonymised, such that the first tenant is not made aware of the name of the third tenant. The access request may include a high level description of the third tenant, such as their status and general geographic location, but information that would enable the first tenant to identify the specific identity of the third tenant is omitted.

In step 9, if the first tenant approves the request, the second portion of the first data set, or the remainder of the data set, is sent to the cloud-storage resource associated with the third tenant. This step may involve the second data portion being sent directly to the cloud-storage resource associated with the third tenant directly, or via the cloud-storage resource associated with the second tenant. On the other hand, if the first tenant rejects the request, no further data in the first set of data is sent to the third tenant.

The steps of the method may be conducted in a different order as described with reference to FIG. 2. For instance, steps 1-5 could be conducted in any suitable order. However, preferably steps 1, 3 and 4 are conducted before step 5. Preferably step 2 is executed before step 7.

As explained above, in the system 10 the first tenant and the second tenant are trusted connections of one another, and thus the first tenant and the second tenant are permitted to share their identities, as well as other private information, with one another. The second tenant and the third tenant are also trusted connections of one another and can share their identities and other private information with each other as well. However, the first tenant and the third tenant do not share a trusted connection. Therefore, in order to ensure privacy the first tenant and the third tenant are required to remain anonymous to one another.

The first tenant can allow a first portion of a data set to be shared with the third tenant because the third tenant is a trusted connection of the second tenant. The first portion of the data may be, for instance, a label associated with the data or a subset of the data that has lower privacy restrictions than the remainder of the data. The first portion of the data is made available to the third tenant, which the third tenant can use to request access to another portion, or the remainder, of the data set form the first tenant.

In the system 10, the request for access to the data set is submitted to the first tenant without the identity of the third tenant being made available to the first tenant. However, trust in the third tenant is implied via the trust established between the first and second tenants, and the trust established between the second and third tenants, without a direct trusted connection being made between the first and third tenants. In one example, the identity of the third tenant, which the first tenant is not sent, may be the name of the third tenant or another form of identification label for the third tenant.

The first tenant can choose to grant the request for access to the data, and once the request is authorised the data is transferred from the cloud-storage resource of the first tenant to the cloud-storage resource of the third tenant. This may occur directly, or alternatively via the cloud-storage resource of the second tenant.

The first tenant can ensure that data is transferred to a trusted connection by virtue of the trusted established between the first and second tenants, and the second and third tenants respectively. However, the system 10 allows the identity of the third tenant to be kept secret from the first tenant, thus maintaining the privacy of the third tenant.

In the system 10, it is possible for the first tenant to force control over the tenants with which the second tenant is allowed to share the first portion of the data. As mentioned previously, the first portion of the data may have lower privacy restrictions than the remainder of the data. However, it may be desirable to restrict access to the first portion of the data to certain categories of tenants. Thus, certain categories of tenants are unable to request access to any part of the data set of the first tenant, which prevents the data being shared with unwanted tenants. Furthermore, the second tenant is able to impose another layer of control over the category of tenants with which the first portion of data can be shared.

In the embodiments described above the data, the data set and the portions of the data sets may refer to any suitable data type. For instance, the data may be scientific data, medical data, music data, financial data, image data and/or text data. In one specific example, the first set of data is medical data relating to a specific patient. In this example, the first portion of the data set that is transferred to the third tenant may be a summary of the data set that does not include sensitive information regarding the patient, such as the patient's name. Once the first tenant has authorised the third tenant, the remainder of the data set is transferred to the third tenant including the sensitive information. In another example, the first set of data may relate to a financial transaction, such as an investment opportunity. In this example, the first portion of the data set that is transferred to the third tenant may be a summary of the investment opportunity, and the remainder of the data set may comprise data allowing the investment opportunity to be completed.

Figure 3:
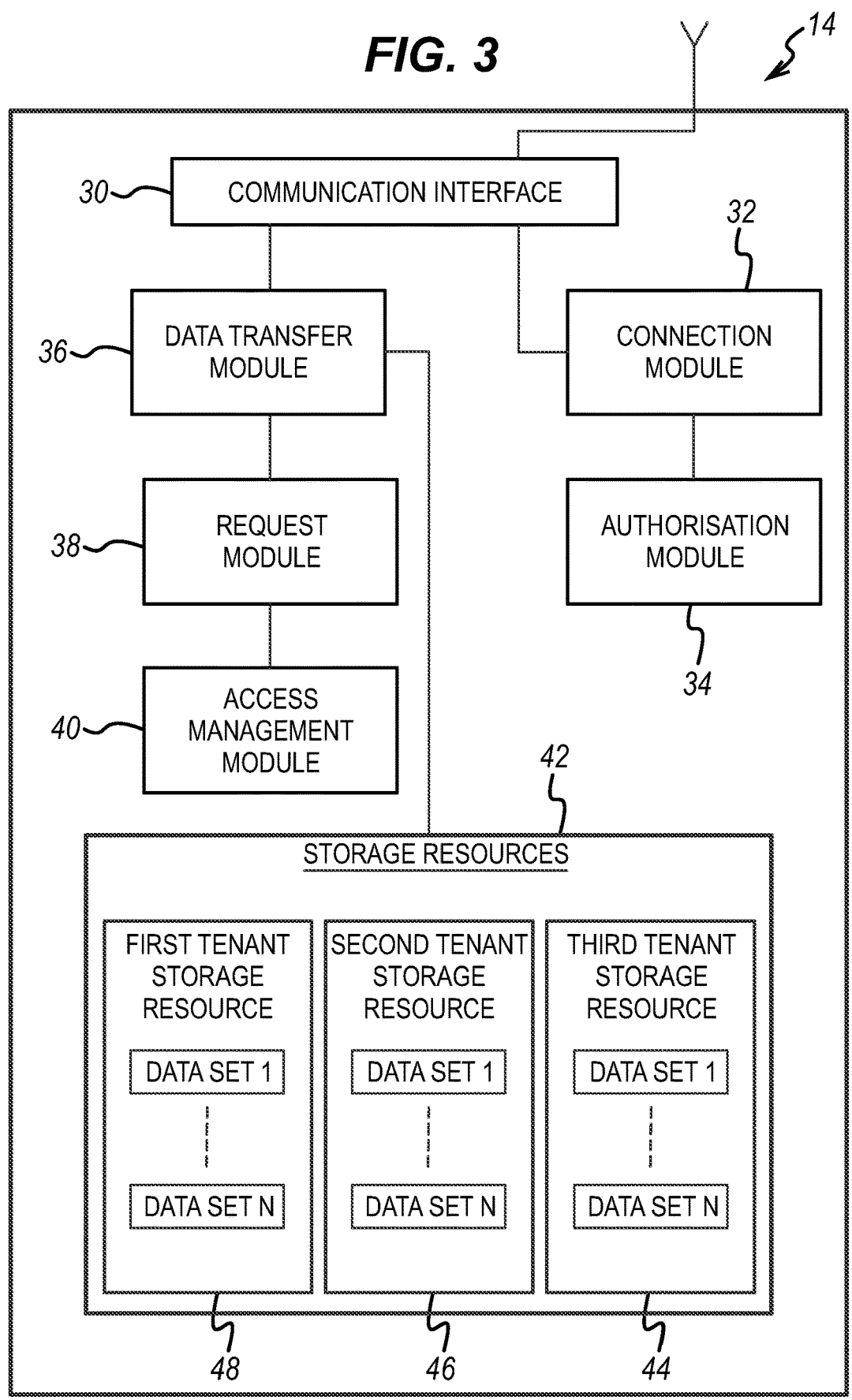
FIG. 3 illustrates a schematic of a data management system.

Referring to FIG. 3, the data management system 14 comprises a communication interface 30, a connection module 32, an authorisation module 34, a data transfer module 36, a request module 38, an access management module 40 and storage resources 42.

The communication interface 30 is arranged to facilitate transmitting and receiving messages to and from the devices 11, 12, 13 in the system 10 via the communications network 15.

The connection module 32 is arranged to establish trusted connections between tenants of the system 10, for instance, as explained with reference to steps 1 and 2. The connection module 32 may comprise a database for storing a record of the trusted connections established between tenants.

The access management module 40 is arranged to provide tenants with the ability to set access restrictions in connection with data, as explained with reference to steps 4 to 6. In addition, the access management module 40 is arranged to determine if the relevant criteria are fulfilled by a particular tenant before sending data to that tenant, as in step 7.

The request module 38 is arranged to allow a tenant to send a request for access to a particular portion of data to another tenant, as explained with reference to step 8.

The authorisation module 34 is arranged to manage the requests for access to data that are sent between tenants in the method, as explained with reference to step 8. Specifically, the authorisation module is arranged to allow a first tenant to grant an authorisation of the access request.

The data transfer module 36 is arranged to transfer data from the cloud-storage resource of one tenant to the cloud-storage resource of a different tenant, as explained with reference to steps 7 and 9.

The storage resource 40 comprises distinct storage resources that are associated with each respective tenant. The storage resource is arranged to store sets of data, as in step 3.

In the example described above, the storage resource 40 comprises a first tenant storage resource 48, a second tenant storage resource 46 and a third tenant storage resource 44. Each one of the storage resources may store a plurality of distinct data sets. Only a tenant that is associated with a particular cloud-storage resource is able to access the data in that cloud-storage resource without permission to do so from the tenant.

In this example, the first tenant, the second tenant and the third tenant may share a subscription to the storage resource 42 which comprises the first cloud-storage resource 48, the second cloud-storage resource 46 and third cloud-storage resource 44. The first cloud-storage resource 48, the second cloud-storage resource 46 and the third cloud cloud-storage resource 44 are partitioned from one another.

The first cloud-storage resource 48 may comprise a first table-storage resource and the second cloud-storage resource 46 comprises a second table-storage resource. In this example, the first table-storage resource and the second table-storage resource may be partitioned from another within the same table.

The first cloud-storage resource 48 may comprises a first blob-storage resource and the second cloud-storage resource 46 may comprises a second blob-storage resource. The first blob-storage resource comprises a separate container to a container of the second blob-storage resource.

FIG. 4 shows an exemplary electronic device 401 according to any of the electronic devices of this disclosure (such as the devices 11, 12, 13 and the data management system 14). The electronic device 401 comprises processing circuitry 410 (such as a microprocessor) and a memory 412. Electronic device 401 may also comprise one or more of the following subsystems: a power supply 414, a display 416, a transceiver 420, and an input 426.

Processing circuitry 410 may control the operation of the electronic device 401 and the connected subsystems to which the processing circuitry is communicatively coupled. Memory 412 may comprise one or more of random access memory (RAM), read only memory (ROM), non-volatile random access memory (NVRAM), flash memory, other volatile memory, and other non-volatile memory.

Display 416 may be communicatively coupled with the processing circuitry 410, which may be configured to cause the display 416 to output images representative of the data transferred between the users of the system.

The display 416 may comprise a touch sensitive interface, such as a touch screen display. The display 416 may be used to interact with software that runs on the processor 410 of the electronic device 401. The touch sensitive interface permits a user to provide input to the processing circuitry 410 via a discreet touch, touches, or one or more gestures for controlling the operation of the processing circuitry and the functions described herein. It will be appreciated that other forms of input interface may additionally or alternatively be employed for the same purpose, such as the input 426 which may comprise a keyboard or a mouse at the input device.

The transceiver 420 may be one or more long-range RF transceivers that are configured to operate according to communication standard such as LTE, UMTS, 3G, EDGE, GPRS, GSM, and Wi-Fi. For example, electronic device 401 may comprise a first wireless transceiver 421, such as a cellular transceiver, that is configured to communicate with a cell tower 403 via to a cellular data protocol such as LTE, UMTS, 3G, EDGE, GPRS, or GSM, and a second transceiver 428, such as a Wi-Fi transceiver, that is configured to communicate with a wireless access point 404 via to a Wi-Fi standard such as 802.11 ac/n/g/b/a. In this regard and for the purposes of all embodiments herein concerning a long-range wireless protocol, a long-range wireless protocol may be a protocol which is capable and designed for communication over 5, 10, 20, 30, 40, 50, or 100 m. This is in contrast to short-range wireless protocol mentioned above. The long-range wireless protocol may communicate utilizing higher power than the short-range wireless protocol. The range (e.g. line of sight distance) between the long-range end nodes (electronic device and router or base station) for the long-range wireless protocol may be greater than the range (e.g. line of sight distance) between the short-range end nodes (e.g. electronic device and wireless beacon).

Electronic device 401 may be configured to communicate via the transceiver 420 with a network 440. Network 440 may be a wide area network, such as the Internet, or a local area network. Electronic device 401 may be further configured to communicate via the transceiver 420 and network 440 with one or more systems 14 or user devices 11, 12, 13. These servers or user devices may be any one of those described herein.

The term "comprising" encompasses "including" as well as "consisting" e.g. a composition "comprising" X may consist exclusively of X or may include something additional e.g. X+Y.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

It will be appreciated that the modules described herein may be implemented in hardware or in software. Furthermore, the modules may be implemented at various locations throughout the system.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the module described above may be implemented in hardware or software.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

List of Numbered Embodiments

Embodiment 1. A system for sharing data between tenants served by a software instance, the system comprising:
  a connection module arranged to establish a trusted connection between a first tenant and a second tenant of the software instance, and establish a trusted connection between a second tenant and a third tenant of the software instance;
  a first cloud-storage resource associated with the first tenant arranged to store a first set of data;
  a data transfer module arranged to transfer a first portion of the first set of data to a third cloud-storage resource associated with the third tenant;
  a request module arranged to transmit an access request for the first set of data from the third tenant to the first tenant, without indicating an identification of the third tenant to the first tenant;
  an authorisation module arranged to allow the first tenant to grant an authorisation of the access request; and
  wherein the data transfer module is arranged to transfer a second portion of the first set of data to the cloud-storage resource associated with the third tenant via the second tenant, in response to the authorisation.

Embodiment 2. The system of embodiment 1 further comprising:
  an access management module arranged to generate a first access restriction set by the first tenant, wherein the first access restriction comprises at least one first category of tenant to which the first set of data is not to be transmitted via the second tenant; and wherein the access management module is arranged to determine if a category of the third tenant matches the at least one first category of tenant in the first access restriction;
  wherein the data transfer module is arranged to transfer the first portion of the first set of data to the third tenant, in response to the access management module determining that the category of the third tenant does not match the first category of tenant in the first access restriction; and
  wherein the data transfer module is arranged to prevent transmission of the first portion of the first set of data to the third tenant, in response to the access management module determining that the category of the third tenant matches the at least one first category of tenant in the first access restriction.

Embodiment 3. A system for sharing data between tenants served by a software instance, the system comprising:
  a connection module arranged to establish a trusted connection between a first tenant and a second tenant of the software instance; and wherein the connection module is arranged to establish a trusted connection between a second tenant a third tenant of the software instance;
  a first cloud-storage resource associated with the first tenant arranged to store a first set of data;
  an access management module arranged to generate a first access restriction set by the first tenant, wherein the first access restriction comprises at least one first category of tenant to which the first set of data is not to be transmitted via the second tenant;
  wherein the access management module is arranged to determine if a category of the third tenant matches the at least one first category of tenant in the first access restriction;
  wherein the data transfer module is arranged to transfer at least a first portion of the first set of data to a cloud-storage resource associated with the third tenant, in response to the access management module determining that the category of the third tenant does not match the first category of tenant in the first access restriction; and
  wherein the data transfer module is arranged to prevent transmission of at least a first portion of the first set of data to the cloud-storage resource associated with the third tenant, in response to the access management module determining that the category of the third tenant matches the first category of tenant in the first access restriction.

Embodiment 4. The system of embodiment 3 further comprising:
  a request module arranged to transmit an access request for the first set of data from the third tenant to the first tenant, without transmitting an identification of the third tenant to the first tenant;
  an authorisation module arranged to allow the first tenant to grant an authorisation of the access request; and
  wherein the authorisation module is arranged to transfer a second portion of the first set of data for storage at the cloud-storage resource associated with the third tenant via the second tenant in response to the authorisation.

Embodiment 5. The system of any one of embodiments 1, 2 and 4 wherein transmitting the access request for the first set of data from the third tenant to the first tenant, without transmitting an identification of the third tenant to the first tenant, comprises anonymising the identity of the third tenant in the access request.

Embodiment 6. The system of any one of embodiments 2 to 5 wherein the access management module is arranged to generate a second access restriction set by the second tenant, wherein the second access restriction comprises at least one second category of tenant to which the first set of data is not to be transmitted;
  wherein the access management module is arranged to determine if a category of the third tenant matches the second category in the first access restriction;
  wherein the data transfer module is arranged to transfer at least a portion of the first set of data to the third tenant in response to the access management module determining that the first category or the second category does not match the at least one category of tenant of the third tenant; and
  the data transfer module is arranged to prevent transmission of at least a portion of the first set of data to the third tenant, in response to the access management module determining that the first category or the second category matches the at least one category of tenant of the third tenant.

Embodiment 7. The system of any one of embodiments 2 to 6 wherein the cloud-storage resource associated with the first tenant is arranged to store a plurality of sets of data comprising the first set of data;
  wherein the access management module is to allow the first tenant to generate a third access restriction, wherein the third access restriction comprises at least a third category of tenant to which the plurality of sets of data are not to be transmitted via the second tenant;

wherein the access management module is to determine if a category of the third tenant matches the at least one third category of tenant in the first access restriction;

wherein the data transfer module is arranged to transfer at least a portion of each one of the plurality of sets of data to the third tenant, in response to determining that the category of the third tenant does not match the at least one third category of tenant in the third access restriction; and wherein the data transfer module is arranged to prevent transmission of at least a portion of the first set of data to the third tenant, in response to determining that the category of the third tenant matches the at least one third category of tenant in the first access restriction.

Embodiment 8. A computer-implemented method of sharing data between tenants served by a software instance, the method comprising:

establishing a trusted connection between a first tenant and a second tenant of the software instance;

establishing a trusted connection between a second tenant and a third tenant of the software instance;

storing a first set of data at a first cloud-storage resource associated with the first tenant;

transferring a first portion of the first set of data to a third cloud-storage resource associated with the third tenant;

transmitting an access request for the first set of data from the third tenant to the first tenant, without transmitting an identification of the third tenant to the first tenant;

granting, by the first tenant, an authorisation of the access request from the first tenant to the second tenant and, in response to the granting of the authorisation, transferring a second portion of the first set of data for storage at the third cloud-storage resource associated with the third tenant via the second cloud-storage resource associated with the second tenant.

Embodiment 9. A computer-implemented method of sharing data between tenants served by a software instance, the method comprising:

establishing a trusted connection between a first tenant and a second tenant of the software instance;

establishing a trusted connection between a second tenant a third tenant of the software instance;

storing a first set of data at a first cloud-storage resource associated with the first tenant;

generating a first access restriction by the first tenant, wherein the first access restriction comprises at least one first category of tenant to which the first set of data is not to be transmitted via the second tenant;

determining if a category of the third tenant matches the first category of tenant in the first access restriction;

in response to determining that the category of the third tenant does not match the first category of tenant in the first access restriction, transferring at least a portion of the first set of data to the third tenant; and in response to determining that the category of the third tenant matches the first category of tenant in the first access restriction, preventing the transfer of at least a portion of the first set of data to the third tenant.

Embodiment 10. The computer-implemented method or the system of any one of embodiments 2 to 9 wherein the first or the second category of the first or second access restriction comprises:

a geographic category defining the geographical location of a tenant; or a status category defining a status of the tenant.

Embodiment 11. The computer-implemented method or the system of any one of the preceding embodiments wherein the first tenant, the second tenant and the third tenant share a subscription to a cloud-storage resource comprising the first cloud-storage resource, the second cloud-storage resource and third cloud-storage resource; and wherein the first cloud-storage resource, the second cloud-storage resource and the third cloud cloud-storage resource are partitioned from one another.

Embodiment 12 The computer-implemented method or the system of any one of the preceding embodiments wherein the first cloud-storage resource comprises a first table-storage resource and the second cloud-storage resource comprises a second table-storage resource; and wherein the first table-storage resource and the second table-storage resource are partitioned from another within the same table.

Embodiment 13. The computer-implemented method or the system of any one of preceding embodiments wherein the first cloud-storage resource comprises a first blob-storage resource and the second cloud-storage resource comprises a second blob-storage resource;

wherein the first blob-storage resource comprises a separate container to a container of the second blob-storage resource.

Embodiment 14. A computer program comprising instructions which, when the computer program is executed by a computer, cause the computer to carry out the method of any one of embodiments 8 to 13.

Embodiment 15. A computer-readable medium comprising instructions which, when executed on a computer, cause the computer to carry out the method any one of embodiments 8 to 13.

What is claimed:

1. A system for sharing data between tenants served by a software instance, the system comprising:

a connection module arranged to establish a trusted connection between a first tenant and a second tenant of the software instance, and establish a trusted connection between the second tenant and a third tenant of the software instance;

a first cloud-storage resource associated with the first tenant arranged to store a first set of data;

a data transfer module arranged to transfer a first portion of the first set of data to a third cloud-storage resource associated with the third tenant;

a request module arranged to transmit an access request for the first set of data from the third tenant to another tenant, without indicating an identification of the third tenant;

an authorisation module arranged to allow the first tenant to grant an authorisation of the access request; and wherein the data transfer module is arranged to transfer a second portion of the first set of data to the third cloud-storage resource associated with the third tenant via the second tenant, in response to the authorisation.

2. The system of claim 1 further comprising:

an access management module arranged to generate a first access restriction set by the first tenant, wherein the first access restriction comprises at least one first category of tenant to which the first set of data is not to be transmitted via the second tenant; and wherein the access management module is arranged to determine if a category of the third tenant matches the at least one first category of tenant in the first access restriction;

wherein the data transfer module is arranged to transfer the first portion of the first set of data to the third tenant, in response to the access management module determining that the category of the third tenant does not match the first category of tenant in the first access restriction; and wherein the data transfer module is arranged to prevent transmission of the first portion of the first set of data to the third tenant, in response to the access management module determining that the category of the third tenant matches the at least one first category of tenant in the first access restriction.

3. The system of claim 1 wherein transmitting the access request for the first set of data from the third tenant to the another tenant, without transmitting the identification of the third tenant, comprises anonymising the identity of the third tenant in the access request.

4. The system of claim 2 wherein the access management module is arranged to generate a second access restriction set by the second tenant, wherein the second access restriction comprises at least one second category of tenant to which the first set of data is not to be transmitted;

wherein the access management module is arranged to determine if the category of the third tenant matches the second category in the first access restriction;

wherein the data transfer module is arranged to transfer at least the first portion of the first set of data to the third tenant in response to the access management module determining that the first category or the second category does not match the at least one category of tenant of the third tenant; and the data transfer module is arranged to prevent transmission of at least the first portion of the first set of data to the third tenant, in response to the access management module determining that the first category or the second category matches the at least one category of tenant of the third tenant.

5. The system of claim 2 wherein the first cloud-storage resource associated with the first tenant is arranged to store a plurality of sets of data comprising the first set of data;

wherein the access management module is to allow the first tenant to generate a third access restriction, wherein the third access restriction comprises at least a third category of tenant to which the plurality of sets of data are not to be transmitted via the second tenant;

wherein the access management module is to determine if the category of the third tenant matches the at least one third category of tenant in the third access restriction;

wherein the data transfer module is arranged to transfer at least a first portion of each one of the plurality of sets of data to the third tenant, in response to determining that the category of the third tenant does not match the at least one third category of tenant in the third access restriction; and wherein the data transfer module is arranged to prevent transmission of at least the first portion of the first set of data to the third tenant, in response to determining that the category of the third tenant matches the at least one third category of tenant in the third access restriction.

6. The system of claim 2 wherein the first or the second category of the first or second access restriction comprises:
a geographic category defining a geographical location of a tenant; or
a status category defining a status of the tenant.

7. The system of claim 1 wherein a second cloud-storage resource is associated with the second tenant, wherein the first tenant, the second tenant and the third tenant share a subscription to a cloud-storage resource comprising the first cloud-storage resource, a second cloud-storage resource and the third cloud-storage resource; and wherein the first cloud-storage resource, the second cloud-storage resource and the third cloud-storage resource are partitioned from one another.

8. The system of claim 1 wherein a second cloud-storage resource is associated with the second tenant, wherein the first cloud-storage resource comprises a first table-storage resource and the second cloud-storage resource comprises a second table-storage resource; and wherein the first table-storage resource and the second table-storage resource are partitioned from another within a same table.

9. The system of claim 1 wherein a second cloud-storage resource is associated with the second tenant, wherein the first cloud-storage resource comprises a first blob-storage resource and the second cloud-storage resource comprises a second blob-storage resource;

wherein the first blob-storage resource comprises a separate container to a container of the second blob-storage resource.

10. A computer-implemented method of sharing data between tenants served by a software instance, the method comprising:
establishing a trusted connection between a first tenant and a second tenant of the software instance;
establishing a trusted connection between the second tenant and a third tenant of the software instance;
storing a first set of data at a first cloud-storage resource associated with the first tenant;
transferring a first portion of the first set of data to a third cloud-storage resource associated with the third tenant;
transmitting an access request for the first set of data from the third tenant to another tenant, without transmitting an identification of the third tenant;
granting, by the first tenant, an authorisation of the access request and, in response to the granting of the authorisation, transferring a second portion of the first set of data for storage at the third cloud-storage resource associated with the third tenant via a second cloud-storage resource associated with the second tenant.

11. A non-transitory computer-readable medium comprising instructions which, when executed on a computer, cause the computer to carry out the method of claim 10.

12. A system for sharing data between tenants served by a software instance, the system comprising:
a connection module arranged to establish a trusted connection between a first tenant and a second tenant of the software instance; and
wherein the connection module is arranged to establish a trusted connection between the second tenant and a third tenant of the software instance;
a first cloud-storage resource associated with the first tenant arranged to store a first set of data; and
an access management module arranged to generate a first access restriction set by the second tenant, wherein the first access restriction comprises at least one first category of tenant to which the first set of data is not to be transmitted via the second tenant;
wherein the access management module is arranged to determine if a category of the third tenant matches the at least one first category of tenant in the first access restriction;
wherein a data transfer module is arranged to transfer at least a first portion of the first set of data to a third cloud-storage resource associated with the third tenant, in response to the access management module determining that the category of the third tenant does not match the first category of tenant in the first access restriction;

wherein the data transfer module is arranged to prevent transmission of at least the first portion of the first set of data to the third cloud-storage resource associated with the third tenant, in response to the access management module determining that the category of the third tenant matches the first category of tenant in the first access restriction.

13. The system of claim 12 further comprising:

a request module arranged to transmit an access request for the first set of data from the third tenant to the second tenant, without transmitting an identification of the third tenant to the first tenant;

an authorisation module arranged to allow the first tenant to grant an authorisation of the access request via; and wherein the authorisation module is arranged to transfer a second portion of the first set of data for storage at the third cloud-storage resource associated with the third tenant via the second tenant in response to the authorisation.

14. A computer-implemented method of sharing data between tenants served by a software instance, the method comprising:

establishing a trusted connection between a first tenant and a second tenant of the software instance;

establishing a trusted connection between the second tenant and a third tenant of the software instance;

storing a first set of data at a first cloud-storage resource associated with the first tenant;

generating a first access restriction by the second tenant, wherein the first access restriction comprises at least one first category of tenant to which the first set of data is not to be transmitted via the second tenant;

determining if a category of the third tenant matches the first category of tenant in the first access restriction;

in response to determining that the category of the third tenant does not match the first category of tenant in the first access restriction, transferring at least a portion of the first set of data to the third tenant; and in response to determining that the category of the third tenant matches the first category of tenant in the first access restriction, preventing the transfer of at least the portion of the first set of data to the third tenant.

15. A non-transitory computer-readable medium comprising instructions which, when executed on a computer, cause the computer to carry out the method of claim 14.

* * * * *